United States Patent [19]
Kim et al.

[11] Patent Number: 5,146,335
[45] Date of Patent: Sep. 8, 1992

[54] SIMULTANEOUS, MULTI-ASPECT RATIO TELEVISION DISPLAY

[75] Inventors: Jihn K. Kim; Chang W. Hong, both of Seoul, Rep. of Korea

[73] Assignee: Samsung Electronics Co., Ltd., Suweon, Rep. of Korea

[21] Appl. No.: 630,203

[22] Filed: Dec. 19, 1990

[30] Foreign Application Priority Data

Dec. 21, 1989 [KR] Rep. of Korea ............... 89-19424

[51] Int. Cl.⁵ .................................................. H04N 5/45
[52] U.S. Cl. ...................................... 358/183; 358/140
[58] Field of Search ............... 358/22, 22 PIP, 183, 358/140

[56] References Cited

U.S. PATENT DOCUMENTS

| | | | |
|---|---|---|---|
| 4,839,728 | 6/1989 | Casey | 358/22 X |
| 4,935,815 | 6/1990 | Ichikawa et al. | 358/140 |
| 4,953,027 | 8/1990 | Tong et al. | 358/140 X |
| 4,962,427 | 10/1990 | Lunn et al. | 358/140 X |
| 4,984,083 | 1/1991 | Okamura | 358/183 |
| 4,991,012 | 2/1991 | Yoshino | 358/22 PIP |
| 5,040,067 | 8/1991 | Yamazaki | 358/22 PIP |

FOREIGN PATENT DOCUMENTS 61-95683  5/1986  Japan .
1-221067  9/1989  Japan .

Primary Examiner—James J. Groody
Assistant Examiner—Mark R. Powell
Attorney, Agent, or Firm—Cushman, Darby & Cushman

[57] ABSTRACT

A system for simultaneously achieving the complete display of a plurality of subscreens of television video signals together with a main screen of television video signal without any overlapping (i.e., picture-out-of-picture; tiled displays), and thereby offer the pleasure to a viewer, of watching various types of a TV screen displays which are made up of various combinations of the subscreens and the main screen. The apparatus for multipicture regeneration uses an HDTV system and includes horizontal and vertical synchronizing counters, a logic control matrix part, a plurality of signal sources, a switching part, a scan direction data transfer part and an image processor. All of the selected subscreens and the main screen simultaneously displayed completely each with an aspect ratio of 3:4, on a single HDTV screen having an aspect ratio of 9:16.

3 Claims, 3 Drawing Sheets

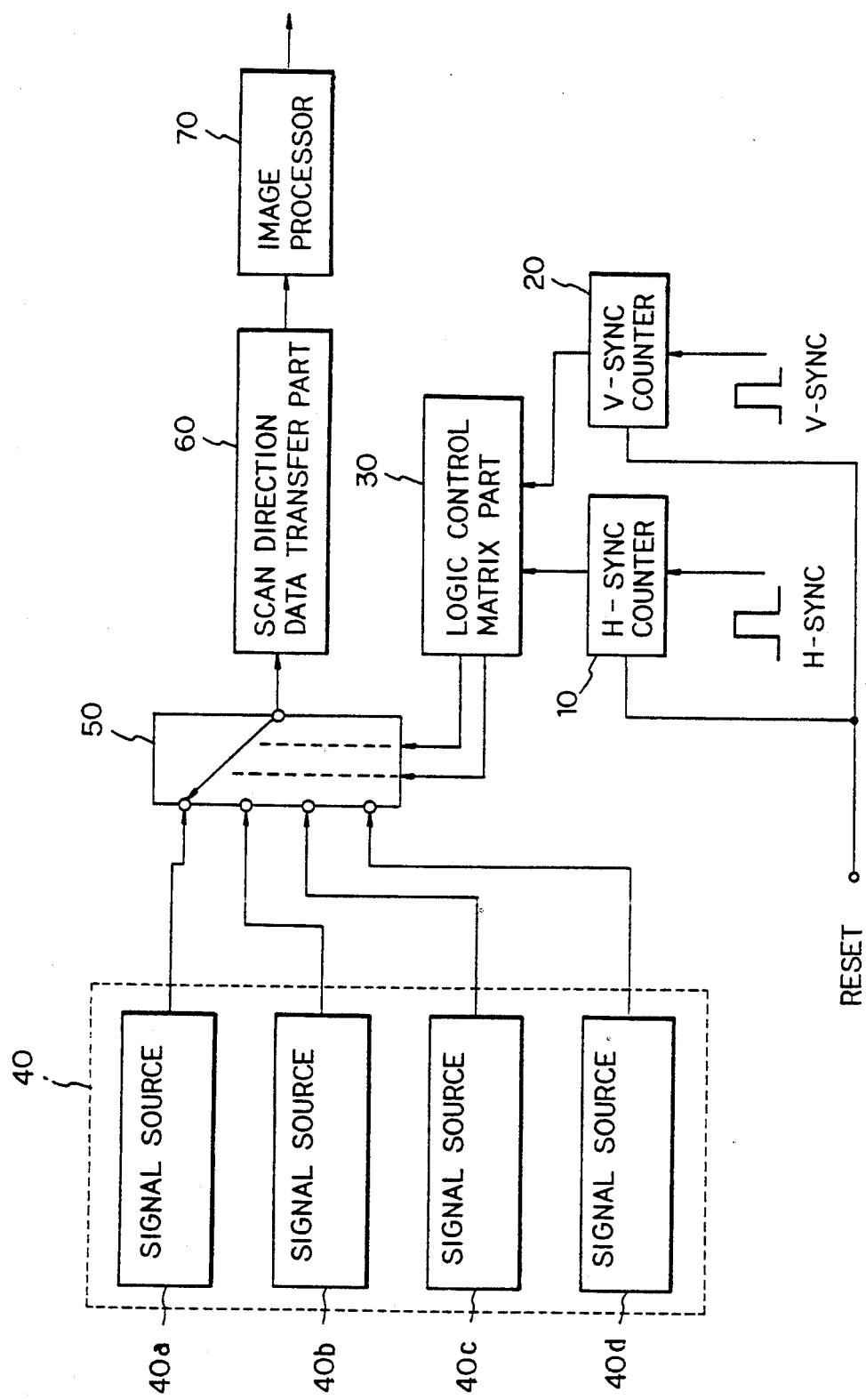

SIMULTANEOUS, MULTI-ASPECT RATIO TELEVISION DISPLAY

BACKGROUND OF THE INVENTION

The present invention broadly relates to a high definition TV(HDTV) system and, more specifically, to a method and a device for multipicture regeneration using a HDTV system, such that a plurality of conventional TV screens, each with an aspect ratio of 3:4, can be displayed, outside one another (i.e., tiled) on an HDTV screen with an aspect ratio of 9:16, without any loss of data.

In conventional PIP (picture-in-picture) technology, when a subscreen is displayed together with a main screen, the subscreen overlaps the main screen, and therefore the overlapped part of the main screen cannot be viewed in the PiP mode. Therefore, it has been a problem that even though the subscreens are wholly displayed, the main screen is partially obscured by the subscreens, and the main screen is displayed incompletely.

SUMMARY OF THE INVENTION

The present invention has an object to resolve the problem of such an incomplete display of the main screen and, more specifically to provide a method and a device for multipicture regeneration using an HDTV system, in which it is possible to watch the subscreens and the main screen, each with an aspect ratio of 3:4, all on one physical screen, which has aspect ratio of 9:16.

According to the present invention, there is provided a device for multipicture regeneration using an HDTV system, in an HDTV system with an aspect ratio of 9:16, including: a horizontal synchronizing counter for counting horizontal synchronizing portions of an HDTV signal; a vertical synchronizing counter for counting vertical synchronizing portions of an HDTV signal; a logic control matrix part connected with the horizontal synchronizing counter and the vertical synchronizing counter for providing respectively different control signals according to horizontal synchronizing counts and vertical synchronizing counts; a plurality of signal sources for simultaneously displaying a plurality of screens (i.e., screen displays or different views) on one HDTV screen; a switching part connected to the logic control matrix part for switching the plurality of signal sources by the control signals from the logic control matrix part according to the horizontal synchronizing counts and the vertical synchronizing counts; a scan direction data transfer part connected to the output of the switching part for providing scan direction data to be displayed on the HDTV screen; and an image processor connected to the scan direction data transfer part for controlling the transferred data.

The present invention also provides a method for multipicture regeneration using an HDTV system, wherein a plurality of general TV screens (i.e., individual screen displays having a conventional 3:4 aspect ratio) can be completely displayed, completely outside one another (i.e., picture-out-of-picture "POP", or tiled) on one HDTV screen, all at the same time, without any overlapping, by regenerating a plurality of subscreens and one main screen with a same aspect ratio of 3:4, on an HDTV screen having an aspect ratio of 9:16.

BRIEF DESCRIPTION OF THE DRAWINGS

These and other objects, features, and advantages of the present invention will become more apparent from the following description of the preferred embodiments, taken in conjunction with the accompanying drawings, in which:

FIG. 2 shows a preferred embodiment of a multipicture regeneration unit using an HDTV system, according to the present invention.

DETAILED DESCRIPTION OF THE PREFERRED EMBODIMENTS

The present invention will be now described in more detail with reference to the accompanying drawings.

Figure 1:
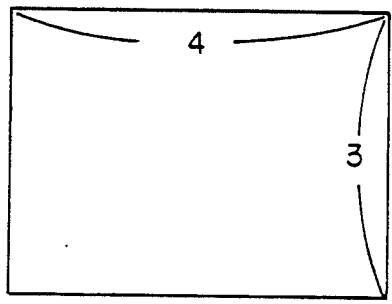
FIGS. 1(A) and 1(B), shows respectively one individual screen (i.e., screen display or "picture") of a conventional TV screen and a HDTV screen, for comparing aspect ratios thereof.
Figure 1:
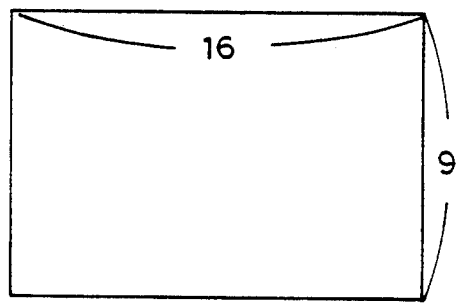

FIGS. 1(A) and 1(B) ratio respectively, show aspect ratios of a conventional TV screen and an HDTV screen. The conventional TV screen has an aspect ratio of 3:4, as shown in FIG. 1(A), and the HDTV screen has an aspect ratio of 9:16, as shown in FIG. 1(B).

FIG. 2 shows a block diagram for explaining a preferred embodiment of the configuration of a multipicture regeneration unit using an HDTV, according to the present invention. In FIG. 2, a horizontal synchronizing counter 10 and a vertical synchronizing counter 20 are shown provided to count horizontal synchronizing input signals and vertical synchronizing input signals, respectively. Both of the counters 10 and 20 are commonly connected with a logic control matrix part 30, which provides them with with respective control signal, according to the number of counter horizontal synchronizing input signals and counted vertical synchronizing input signals.

Meanwhile, a plurality of signal sources 40 provide image signals each with an aspect ratio of 3:4, to be displayed wholly outside one another, i.e., "tiled" on a usual 9:16 aspect ratio HDTV screen and their outputs are connected with a plurality of inputs of a switching part 50 respectively so as to switch the switching part 50 by one of the signal sources 40 in response to the control signal from the logic control matrix part 30. An output of the switching part 50 is connected to a scan direction data transfer part 60 for transferring information about scan positions of the image signals from a selected input signal source. Further the scan direction data transfer part 50 is connected with an image processor 70 for processing the image signals from the signal sources 40 and thereby cause a known device in a known manner to electronically "paint" the HDTV screen, in distinct (non-overlapping) areas with the images generated from the respective signal sources.

Figure 3:
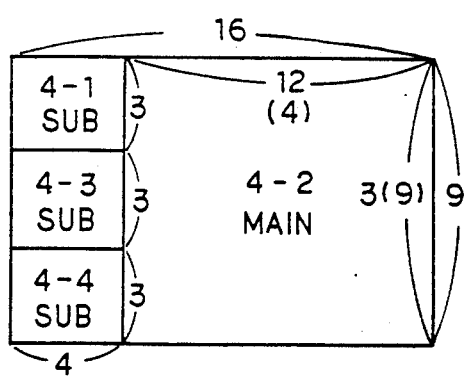
FIGS. 3(A), 3(B), and 4(A) through 4(F), respectively, show shows various arrangements of a plurality of subscreens and a main screen on a single HDTV screen, according to the present invention.
Figure 3:
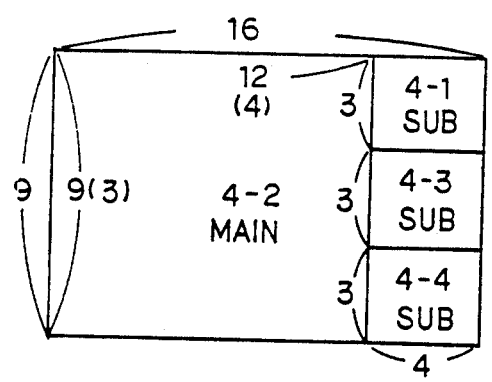
Figure 4:
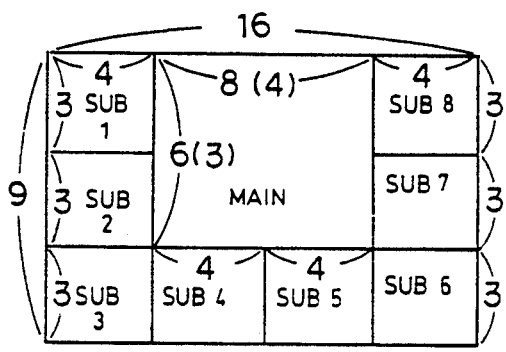
Figure 4:
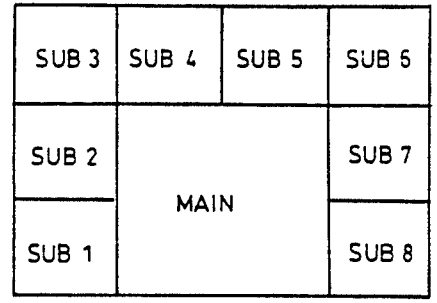
Figure 4C:
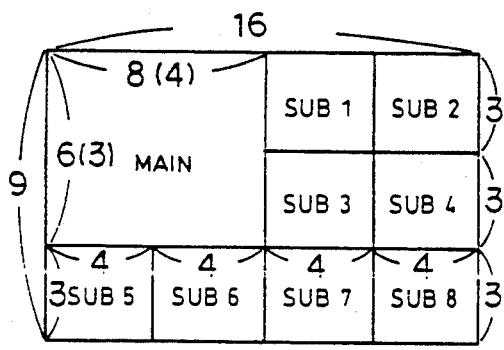
Figure 4D:
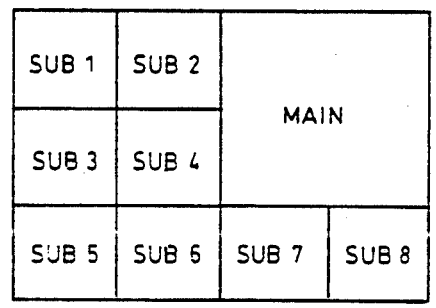
Figure 4E:
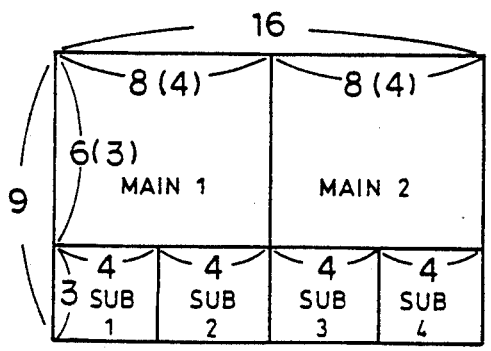
Figure 4F:
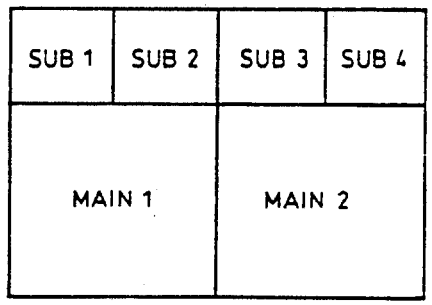

FIG. 3 and FIG. 4 show various combinations of a plurality of subscreens and a main screen, each having an aspect ratio of 3:4, on a single 9:16 aspect ratio HDTV screen, completely without the overlapping.

The operation of the configuration as shown in FIG. 2 will now be described in more detail, using the combinations as shown in FIG. 3(A) and 3(B) as an examples, where one main screen and three subscreens are to be displayed, each with an aspect ratio of 3:4. The horizontal synchronizing counter 10 and the vertical synchronizing counter 20 respectively count the number of the horizontal synchronizing signals, and the vertical synchronizing signals, from the input image signals. Results of the counts are applied to the logic control matrix part 30, in order to provide a control signal for controlling the switching part 50 to select a signal source according to the scan position of the main screen and the subscreens.

For display of a first subscreen 4-1, a first signal source 40a is selected according to the control signal of the logic control matrix part 30. The output data of the first subscreen 4-1 from the first signal source 40a are applied to the scan direction data transfer part 60 through the switching part 50. The scan direction data transfer part 60 determines the vertical and horizontal scan positions for the data to be displayed on the first subscreen 4-1. The display data of the first subscreen 4-1 are further processed by the image processor 70 and then displayed in the appropriate vertical and horizontal scan positions determined by the scan direction data transfer part 60.

As a whole, the logic control matrix part 30 provides the different control signals in an appropriate sequence according to the horizontal synchronizing counts and the vertical synchronizing counts as provided from the horizontal synchronizing counter 10 and the vertical synchronizing counter 20. To describe more specifically, at first, a signal for the first subscreen 4-1 is selected and then a signal for the main screen 4-2 is selected. Next, a signal for a second subscreen 4-3 is selected and then the signal for the main screen 4-2 is selected again. Subsequently, a signal for a third subscreen 4-4 is selected and then the signal for the main screen 4-2 is provided again. The switching part 50 is switched according to the output control signal from the logic control matrix part 30.

Now, with reference to the combination as shown in FIG. 3(B), the control signals from the logic control matrix part 30 are selected in a sequence of: the main screen 4-2, the first subscreen 4-1, the main screen 4-2, the second subscreen 4-3, the main screen 4-2, and the third subscreen 4-4.

As apparent from the above description, the image signals are provided from the plurality of the signal sources 40 corresponding to the scan positions as determined by the outputs from the horizontal synchronizing counter 10 and the vertical synchronizing counter 20. And, such image signals are provided to the scan direction data transfer part 60 and the image processor 70 and are displayed on the appropriate scan positions. Thus, a plurality of conventional TV screens, each with an aspect ratio of 3:4, can be displayed on a single HDTV screen an aspect ratio of 9:16, by using the switching operation of the switching part 50 under the control of the logic control matrix part 30 so various combinations of a main screen and a plurality of subscreens can be achieved simply, as shown in FIG. 4.

As apparent from the above description, the present invention offers the advantage of complete pictures simultaneously for both main screen and each of the subscreens, each with an aspect ratio of 3:4, by scanning the video signals for all of the conventional main and sub screens, each having an aspect ratio of 3:4, as selected by the switching part according to the horizontal synchronizing counts and the vertical synchronizing counts so as to display all of them simultaneously, wholly outside one another, on a single HDTV screen with the aspect ratio of 9:16. Furthermore, the combinations of one main screen and a plurality of subscreens can be varied desirously so that a user can have the pleasure of watching various combinations of TV screen displays.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. In an HDTV system having apparatus and a video display means for providing a display of video signals having a 9:16 aspect ratio, a device for selectively simultaneously providing on said video display means a plurality of 3:4 aspect ratio displays of video signals, each constituting a respective image, and all said images being substantially completely non-overlappingly tiled, said device comprising:

a horizontal synchronizing counter for counting horizontal synchronizing signals associated with said first display of video signals having a 9:16 aspect ratio;

a vertical synchronizing counter for counting vertical synchronizing signals associated with said first display of video signals having a 9:16 aspect ratio;

a logic control matrix part operatively connected with said horizontal and vertical synchronizing counters, for providing control signals related to counts respectively provided by said counters;

a plurality of signal sources each arranged to provide, when selected, a respective set of video signals for a respective video display of a respective image having a 3:4 aspect ratio;

a switching block effectively connected to said logic matrix part and to said logic control matrix part, for switching among said plurality of signal sources, depending upon said control signals, and thereby providing successively switched-to signal sources successively to an output means of said switching block;

a scan position data transfer part effectively connected to said output means of said switching block for transferring scan position data for said 3:4 aspect ratio images to be displayed on said video display means of said HDTV system; and an image processor effectively connected to said scan position data transfer part for processing said 3:4 aspect ratio images, so that each is displayed on a distinct portion of said video display means with none of said 3:4 aspect ratio images substantially overlapping one another.

2. A method for multi-image regeneration in a high definition television system, comprising:

(a) providing an HDTV system having a video display screen structure capable of displaying a set of video signals having a 9:16 aspect ratio and apparatus which electronically repetitively paints the screen structure, horizontal row by horizontal row using an electronic painting structure, and the HDTV system also includes structures for providing signal outputs indicative of horizontal and vertical positioning of the moving interface between where the video display screen structure contains an image which is being replaced, and where the video display screen structure contains an image which is replacing the image which is being replaced;

(b) providing said HDTV system with a plurality of different sets of video signals each corresponding to a respective series of images having a 3:4 aspect ratio;

(c) using said signal outputs to switchingly forward selected ones of said sets of video signals to said electronic painting structure depending upon horizontal and vertical location of said interface, so as to cause said video display screen structure to simultaneously display each of said selected ones of said sets of video signals each with a 3:4 aspect ratio in a respective distinct area of said video display screen structure, with no substantial overlap by any of said sets of video signals of one another.

3. The method of claim 2, wherein:

said distinct areas are arranged on said video display screen structure in a pattern of at least one main area having a relative aspect ratio selected from the group consisting of 9:12 and 6:8, and at least three sub-areas each having a relative aspect ratio of 3:4.

* * * * *